(12) United States Patent
Kus et al.

(10) Patent No.: US 10,683,906 B2
(45) Date of Patent: Jun. 16, 2020

(54) HYDRAULIC DAMPER WITH A COMPRESSION STOP

(71) Applicant: BeijingWest Industries Co., Ltd., Beijing (CN)

(72) Inventors: Pawel Edward Kus, Cracow (PL); Piotr Andrzej Flacht, Cracow (PL); Piotr Stanislaw Suprewicz, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/816,615

(22) Filed: Nov. 17, 2017

(65) Prior Publication Data

US 2018/0156302 A1 Jun. 7, 2018

Related U.S. Application Data

(60) Provisional application No. 62/428,579, filed on Dec. 1, 2016.

(51) Int. Cl.
*F16F 9/58* (2006.01)
*F16F 9/18* (2006.01)
(Continued)

(52) U.S. Cl.
CPC .............. *F16F 9/585* (2013.01); *F16F 9/185* (2013.01); *F16F 9/34* (2013.01); *F16F 9/49* (2013.01); *F16F 2230/0064* (2013.01)

(58) Field of Classification Search
CPC .... F16F 9/585; F16F 9/49; F16F 9/185; F16F 9/34; F16F 2230/0064
See application file for complete search history.

(56) References Cited

U.S. PATENT DOCUMENTS

| | | | | |
|---|---|---|---|---|
| 2,619,199 A | * | 11/1952 | Schwary | F16F 9/49 188/284 |
| 2,729,308 A | * | 1/1956 | Koski | F16F 9/48 137/513.5 |

(Continued)

FOREIGN PATENT DOCUMENTS

| | | |
|---|---|---|
| CN | 101094998 | 12/2007 |
| CN | 202431823 | 9/2012 |

(Continued)

OTHER PUBLICATIONS

First Office Action and search report dated Mar. 4, 2019 for counterpart Chinese patent application No. 201711222950.9, along with machine EN translation downloaded from EPO.

(Continued)

*Primary Examiner* — Melody M Burch
(74) *Attorney, Agent, or Firm* — William H. Honaker; Dickinson Wright PLLC

(57) ABSTRACT

The present invention relates to a hydraulic comprising a compression stop assembly located in a compression chamber and the compression stop assembly comprises a body; an axial member disposed slidably within said body; a covering member fixed on said axial member and provided with at least one compression flow channel and at least one rebound flow channel; a disengaging spring preloaded between said body and said covering member. The compression stop assembly further comprises a rotating member disposed pivotally with respect to said body and capable of covering at least partially said at least one compression flow channel depending on the angular position of said rotating member with respect to said at least one compression flow channel; and at least one cam configured to cooperate with said rotating member in order to change its angular position with respect to its axial displacement.

7 Claims, 4 Drawing Sheets

(51) Int. Cl.
*F16F 9/49* (2006.01)
*F16F 9/34* (2006.01)

(56) References Cited

U.S. PATENT DOCUMENTS

| | | | |
|---|---|---|---|
| 2,742,112 | A | 4/1956 | Wessel |
| 3,036,669 | A * | 5/1962 | Schultze .................... F16F 9/49 |
| | | | 188/282.1 |
| 3,827,538 | A | 8/1974 | Morgan |
| 4,232,767 | A | 11/1980 | De Kock |
| 4,596,320 | A | 6/1986 | Shimokura |
| 4,768,629 | A * | 9/1988 | Wossner .................... F16F 9/49 |
| | | | 188/271 |
| 5,150,775 | A | 9/1992 | Charles et al. |
| 5,251,927 | A | 10/1993 | Charles et al. |
| 5,341,905 | A | 8/1994 | Lu |
| 5,533,597 | A | 7/1996 | Nezu et al. |
| 9,546,707 | B2 * | 1/2017 | Kus ........................... F16F 9/49 |
| 2004/0231934 | A1 | 11/2004 | Heo |
| 2005/0104320 | A1 | 5/2005 | Wesling et al. |
| 2006/0278483 | A1 | 12/2006 | Jiang |
| 2012/0312650 | A1 | 12/2012 | Lun |

FOREIGN PATENT DOCUMENTS

| | | | |
|---|---|---|---|
| CN | 104919207 | | 9/2015 |
| CN | 205173347 | | 4/2016 |
| CN | 205533962 | | 8/2016 |
| DE | 923758 | C | 2/1955 |
| DE | 3411429 | | 10/1985 |
| DE | 4033115 | | 4/1992 |
| DE | 102008042822 | | 4/2010 |
| DE | 102008042822 | A1 | 4/2010 |
| DE | 202014102888 | | 7/2014 |
| FR | 2995048 | A1 * | 3/2014 ............... F16F 9/49 |
| JP | 5899533 | A * | 6/1983 |
| JP | 5899533 | A | 6/1983 |
| JP | 2001271863 | A | 10/2001 |
| KR | 20010097155 | | 11/2001 |
| KR | 20070056930 | | 6/2007 |
| WO | 2005045278 | A1 | 5/2005 |
| WO | 2014085954 | A1 | 6/2014 |

OTHER PUBLICATIONS

Second Office Action and search report dated Aug. 30, 2019 for counterpart Chinese patent application No. 201711222950.9, along with machine EN translation downloaded from EPO.

* cited by examiner

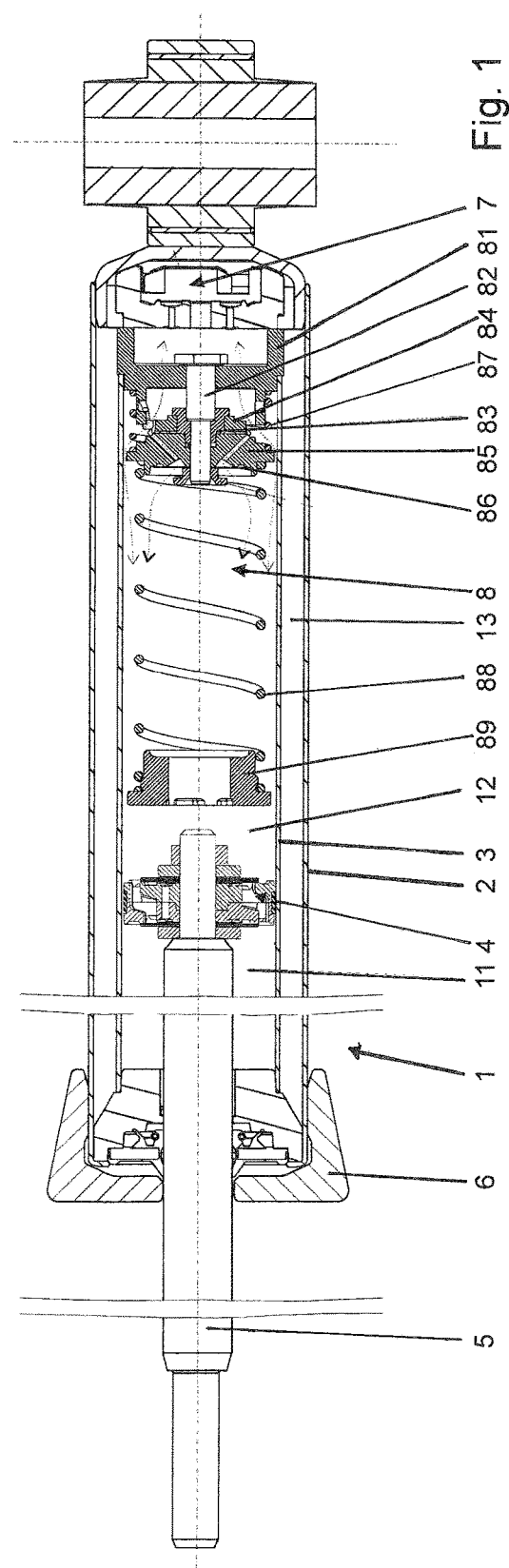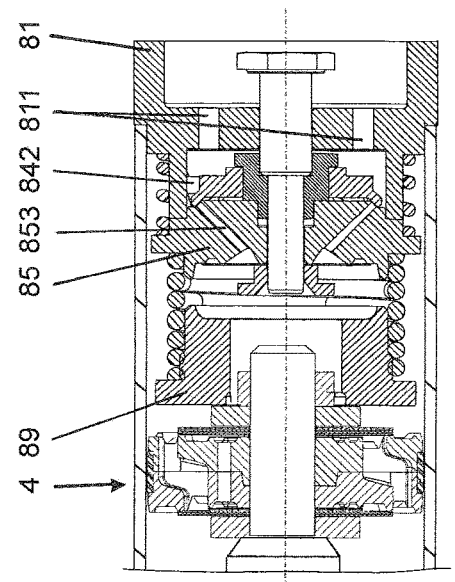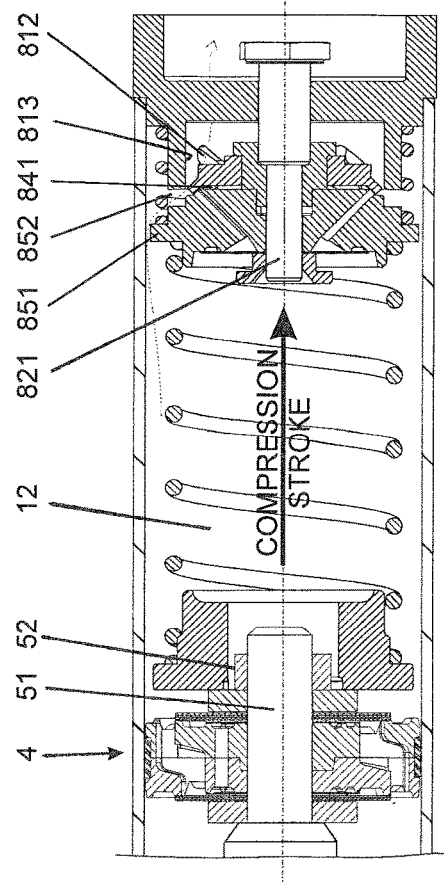

HYDRAULIC DAMPER WITH A COMPRESSION STOP

CROSS REFERENCE TO RELATED APPLICATIONS

This application claims the benefit of U.S. Provisional Application No. 62/428,579 filed Dec. 1, 2016, the contents of which is incorporated herein by reference in its entirety.

STATEMENT REGARDING FEDERALLY SPONSORED RESEARCH

None.

TECHNICAL FIELD

The present invention relates to a hydraulic damper, in particular to a motor vehicle hydraulic suspension damper, comprising a tube filled with a working liquid, a piston assembly disposed slidably inside the tube, thereby dividing the tube into a rebound chamber and a compression chamber, provided with rebound and compression valve assemblies to control the flow of the working liquid within the tube during rebound and compression strokes of the damper, and attached to a piston rod led outside the damper, and a compression stop assembly located in the compression chamber.

BACKGROUND OF THE INVENTION

The compression stop assembly prevents an abrupt stop of a piston at the end of the damper compression stroke by generating an additional damping force which increases progressively as the piston rod displaces.

Publication WO 2014/085954 discloses a hydraulic damper with a compression stop assembly comprising a supporting member partitioning damper internal tube and provided with an axial opening and at least one passage for a substantially unobstructed flow of working liquid; an axial member disposed slidably within said axial opening; a rigid body fixed on said axial member and provided with at least one compression flow passage and at least one rebound flow passage; a compression stroke disc assembly comprising at least one deflective disc and normally covering the compression side of said rigid body; a rebound stroke disc assembly comprising at least one deflective disc and normally covering the rebound side of said rigid body; a first spring disposed between said supporting member and the compression side of said rigid body to normally press said axial member into the compression chamber; and a second spring secured to the rebound side of said rigid body.

Such a construction provides versatile tuning opportunities for shaping damping force characteristics with regard to the position as well as the velocity of the piston rod combining both mechanical (springs), as well as hydraulic (flow passages) damping. Nonetheless this damping force may still become harsh at the position, in which the rigid body abruptly presses the supporting member allowing for a flow of working liquid solely through the compression disc assembly.

Publication U.S. Pat. No. 5,251,927 discloses a hydraulic damper having a base valve assembly provided with a rotary plate having a plurality of openings corresponding to the base valve slots, rotatably connected on the base valve. Rotation of the plate selectively opens or covers up the slots with the openings to permit the fluid flow from the lower chamber to the base valve reservoir. The rotary plate is connected by an axial bore, a stem and an arm to a turnable steering knuckle assembly which enables varying the damping characteristics of the damper based on a steering motion of a vehicle's wheels.

It has been the object of the present invention to provide a hydraulic damper with a compression stop of a simple construction providing versatile tuning options. Yet another object of the present invention has been to provide a damper with a compression stop that would not require substantial modification of the remaining elements of a damper and which might be employed as an add-on device in existing damper designs.

SUMMARY OF THE INVENTION

The invention provides, a damper of the kind mentioned in the outset provided with a compression stop assembly located in the compression chamber and comprising a body; an axial member disposed slidably within said body; a covering member fixed on said axial member and provided with at least one compression flow channel and at least one rebound flow channel; a disengaging spring preloaded between said body and said covering member, which according to the present invention is characterised in that said compression stop assembly further comprises a rotating member disposed pivotally with respect to said body and capable of covering at least partially said at least one compression flow channel depending on the angular position of said rotating member with respect to said at least one compression flow channel; and at least one cam configured to cooperate with said rotating member in order to change its angular position with respect to its axial displacement; wherein axial displacement of said covering member towards said body, while being engaged by the piston assembly results in covering said at least one compression flow channel by said rotating member.

Preferably said compression stop assembly is further provided with an engaging spring attached to said covering member and preferably terminated with an engaging bumper. The engaging spring provides gradual increase of the reaction force before the covering member rotation begins.

Said compression stop assembly preferably further comprises at least one, preferably deflective, disc covering compression side of said rebound flow channels and providing unrestricted inflow of the working liquid to the compression flow channels from the compression chamber. The disc initiates the rebound stroke of the compression stop assembly while in a fully engaged position.

Preferably said rotating member comprises at least one radial projection cooperating with said cam shaped, preferably spirally, in an inner annular surface of said body.

Said rotating member preferably comprises at least one radial projection apt to cover said at least one compression flow channel. Projections provide yet another tuning option for the compression stop assembly.

Furthermore said covering member preferably comprises many, preferably equiangularly spaced, preferably slanted, compression flow channels separated with, preferably equiangularly spaced, preferably axial, rebound flow channels.

Preferably the damper is a twin-tube damper.

In such a case wherein the damper is a twin-tube damper said body of said compression stop assembly preferably has a form of a sleeve fixed between the compression end of the damper main tube and the damper base valve assembly and is provided with at least one channel enabling for a flow of working liquid between the compression chamber and a compensation chamber through the base valve assembly.

In other embodiments said body of said compression stop assembly may be itself a body of the damper base valve assembly.

BRIEF DESCRIPTION OF DRAWINGS

The invention shall be described and explained below in connection with the attached drawings on which:

FIG. 1 is a schematic cross-sectional view of a twin-tube damper according to the present invention with an embodiment of a compression stop assembly in a disengaged position;

FIG. 2 shows the compression stop assembly in an intermediate engaged position during a compression stroke of the damper;

FIG. 3 shows the compression stop assembly in a fully engaged position;

DETAILED DESCRIPTION OF THE PREFERRED EMBODIMENT

Figure 5:
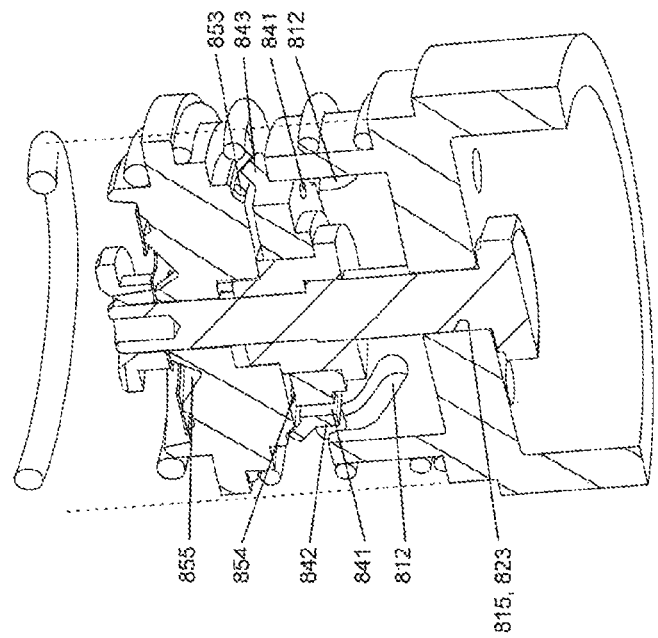
FIG. 5 is a schematic cross-sectional perspective view of a part of the compression stop assembly in a disengaged position.

FIG. 1 presents an embodiment of a twin-tube damper 1 according to the present invention that may be employed in a typical motor vehicle suspension. The damper 1 comprises an external tube 2 and a main tube 3 filled with viscous working liquid inside of which a movable piston assembly 4 is disposed. The piston assembly 4 is attached on an axial protrusion 51 of a piston rod 5 by means of a nut 52 and led outside the damper 1 through a sealed piston rod guide 6. The damper 1 is also provided with a base valve assembly 7 fixed at the other end of the main tube 3. The piston assembly 4 makes a sliding fit with the inner surface of the main tube 3 and divides the main tube 3 into a rebound chamber 11, located between the piston rod guide 6 and the piston assembly 4, and a compression chamber 12 located between the piston assembly 4 and the base valve assembly 7. An additional compensation chamber 13 is located at the other side of the base valve assembly 7.

The term "compression" as used herein with reference to particular elements of the damper 1 refers to these elements or parts of elements which are adjacent to the compression chamber 12 or, in a case of working liquid flow direction, it refers to this flow direction that takes place during the compression stroke of the damper 1. Similarly the term "rebound" as used in this specification with reference to particular elements of the damper 1 refers to these elements or these parts of particular elements which are adjacent to the rebound chamber 11 or, in a case of working liquid flow direction, it refers to this flow direction that takes place during the rebound stroke of the damper 1.

The piston assembly 4 is provided with valve assemblies, e.g., a rebound valve assembly and a compression valve assembly, to control the flow of working liquid passing between the rebound chamber 11 and the compression chamber 12 while the piston assembly 4 is in motion. Also the base valve assembly 7 is provided with valve assemblies to control the flow of working liquid passing between the compression chamber 12 and the compensation chamber 13 while the piston assembly 4 is in motion. Nonetheless, as shall be recognised by those skilled in the art from the following description, the invention is also applicable to other damper constructions.

Figure 6:
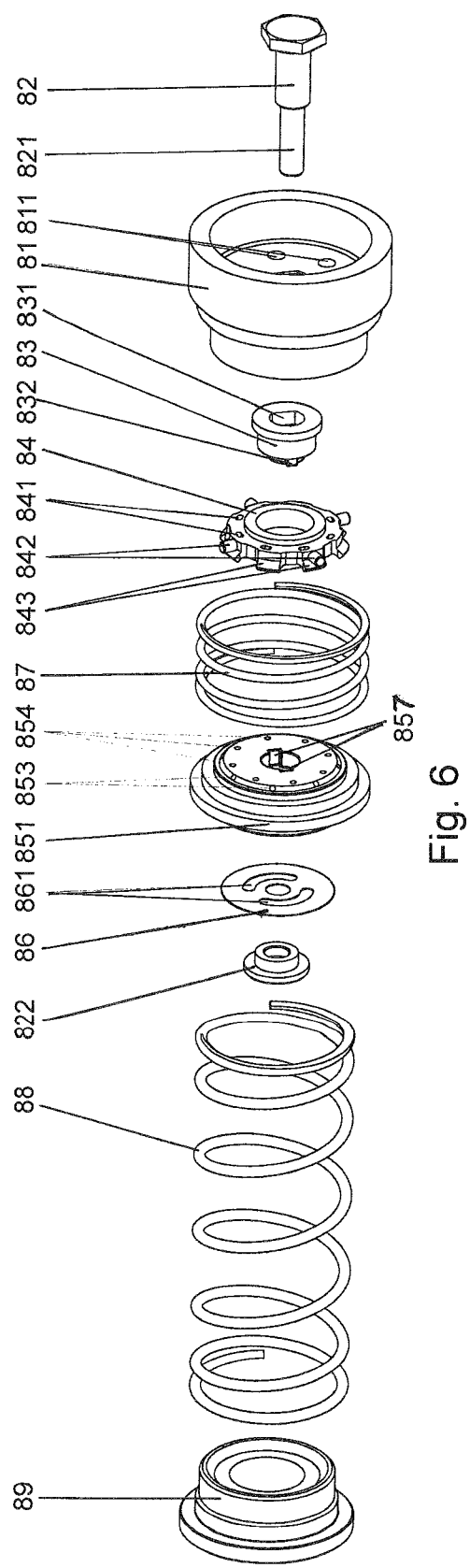
FIG. 6 is a schematic exploded perspective view of the compression stop assembly.

The damper 1 further comprises a compression stop assembly 8 located in the compression chamber 12. As shown in FIG. 6 the compression stop assembly 8 comprises a body 81, an axial member 82 in a form of a bolt, a retaining member 83, a rotating member 84, a covering member 85, a deflective disc 86, a disengaging spring 87, an engaging spring 88, and an engaging bumper 89.

Figure 9:
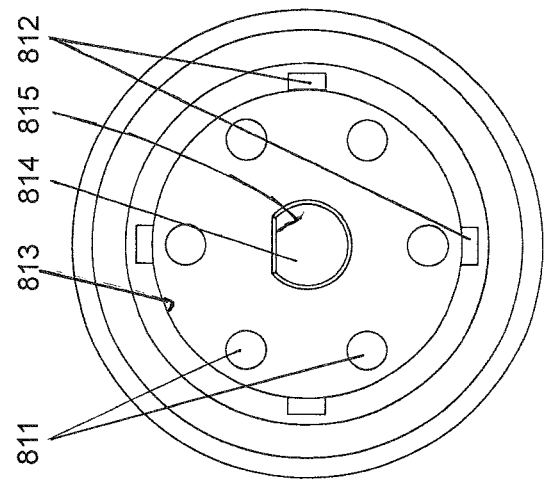
FIG. 9 is a compression side view of the body.

The body 81, shown in particular in FIG. 9, has a form of a sleeve fixed between the compression end of the main tube 3 and the base valve assembly 7 and is provided with six equiangularly spaced axially extending channels 811 (cf. FIG. 3) enabling for a flow of working liquid between the compression chamber 12 and the compensation chamber 13 through the base valve assembly 7.

The bolt 82 passes slidably through an axial noncircular opening 814 in the body 81 so that its rotation is blocked. In other words the opening 814 is provided with a positioning surface 815 cooperating with a matching positioning surface 823 of the bolt 82 (cf. FIG. 4). At the other side the bolt 82 is provided with an axial protrusion 821 of a narrowed diameter on which the retaining member 83 provided with a similar positioning surface 831 (cf. FIG. 6) matching the positioning surface 823 of the bolt 82 is fixed. The covering member 85 is fixed on the retaining member 83 provided with two positioning projections 832 matching positioning recesses 857 of the covering member 85. The deflective disc 86 is disposed at the other side of the covering member 85. Therefore the retaining member 83, the covering member 85 and the disc 86 are secured on this axial protrusion 821 by means of a retainer 822 (a nut, a rivet or any other fixing mechanism might be obviously used in different embodiments) and may only perform a contracted sliding movement along with the bolt 82 in the opening 814 of the body.

Figure 7:
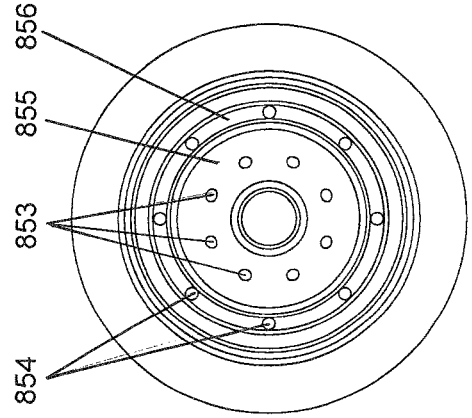
FIG. 7 is a compression side view of the covering member.

The covering member 85, shown in particular in FIG. 7, comprises eight equiangularly spaced slanted compression flow channels 853 joining its compression sides with its rebound side and separated with eight equiangularly spaced axial rebound flow channels 854.

The deflective disc 86 covers the compression side of the rebound flow channels 854 but its deflection enables for a restricted flow of working liquid during the rebound stoke. On the other hand the disc is provided with two kidney-shaped internal openings 861 (cf. FIG. 6) connecting the compression chamber 12 with an annular recess 855 joining the inlets of the slanted compression flow channels 853 and enabling for an unrestricted inflow of the working liquid to these channels from the compression chamber 12. Another annular recess 856 joins the outlets of the axial rebound flow channels 854 equalizing pressure beneath the deflective disc 86 during the rebound stroke (cf. FIG. 4).

The disengaging spring 87 is preloaded between the body 81 and an annular projection 851 of the covering member 85 maintaining the extended position of these elements and defining an annular channel 852 in-between, while the compression stop assembly 8 is not in a fully engaged position shown in FIG. 3. The engaging spring 88 is fixed to the covering member 85 at the other side of its annular projection 851 and connected with the engaging bumper 89 at the other side.

Figure 8:
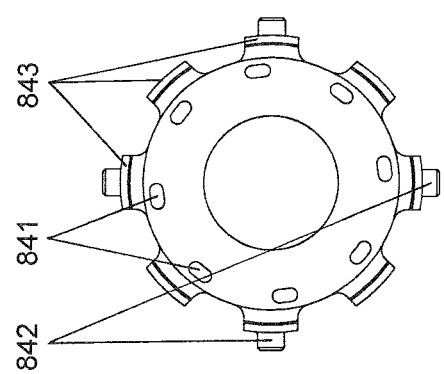
FIG. 8 is a compression side view of the rotating member.

As shown in particular in FIG. 5 and FIG. 8 the rotating member 84 is pivotally disposed on the retaining member 83 and comprises four equiangularly disposed radial and cylindrical projections 842 disposed in and cooperating with four cams 812 that are spirally shaped and in an inner annular surface 813 of the body 81, as shall be explained later. The rotating member 84 further comprises eight equiangularly disposed radial projections 843 adapted to cover the rebound sides or outlets of the slanted compression flow channels 853 of the covering member 85. Nonetheless in a disengaged position of the compression stop assembly 8 shown in FIG. 1 the channels 853 remain uncovered by the covering projections 843.

As shown with dashed arrows, in a disengaged position of the compression stop assembly 8 the working liquid may flow with no substantial restrictions both around the annular projection 851 and the annular channel 852, as well as through the internal openings 861 of the deflective disc 86 and the slanted compression flow channels 853 of the covering member 85.

In a certain position along the piston rod 5 travel during the compression stroke, the piston assembly 4 engages the engaging bumper 89 and starts compressing the engaging spring 88 so that the damping gradually increases as in typical spring compression stops known from the state of art. At some point the load of the engaging spring 88 equalizes the initial preload of the disengaging spring 87 forcing it to compress and axially displacing the covering member 85 along with the bolt 82. This axial movement forces rotation of the rotating member 84 as each cylindrical projection 842 slides spirally in its cam 812. In turn the covering projections 843 gradually cover the compression flow channels 853 of the covering member 85. Eventually, as shown with dashed arrow, in a position shown in FIG. 2 the working liquid may flow out of the compression chamber 12 only around the annular projection 851 of the covering member 85 and the annular channel 852.

Fully engaged, terminal position of the compression stop assembly 8 is illustrated in FIG. 3.

Figure 4:
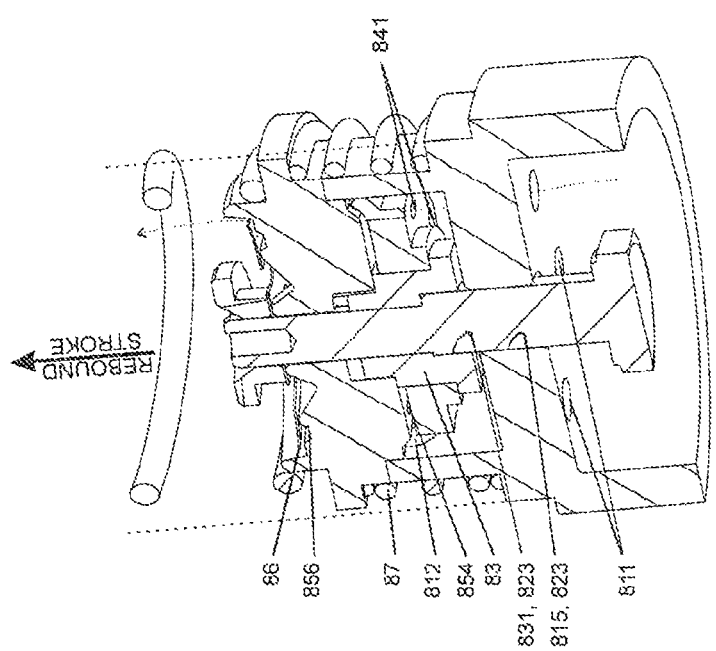
FIG. 4 is a schematic cross-sectional perspective view of a part of the compression stop assembly in a fully engaged position, at the beginning of the rebound stroke.

FIG. 4 illustrates the compression stop assembly 8 in fully engaged position, at the beginning of the rebound stroke. As shown with dashed arrow the pressure of the working liquid flowing through the channels 811 in the body 81, channels 841 in the rotating member 84 and axial rebound flow channel 854 of the covering member 85 leads to deflecting the disc 86 and the compression stop assembly 8 will begin to displace towards the compression chamber under the pressure of the disengaging spring 87.

Figure 10:
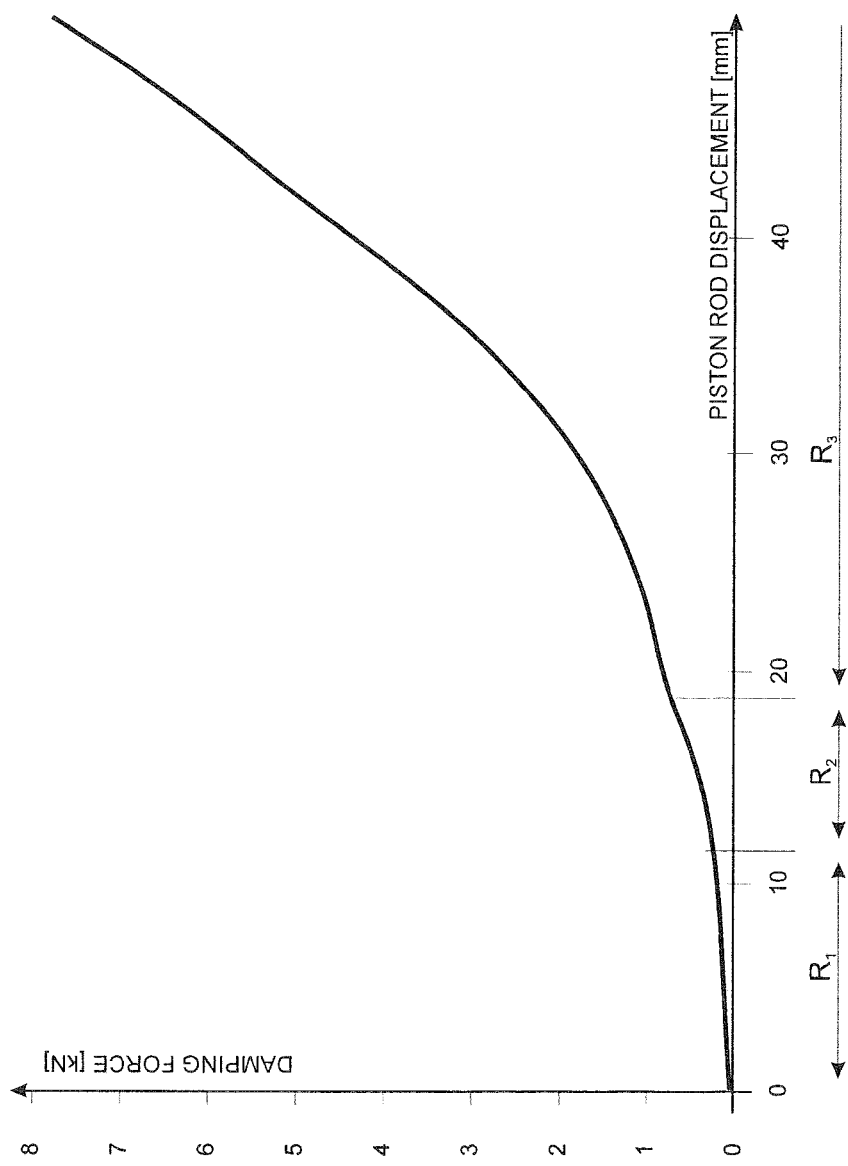
FIG. 10 is a diagram illustrating damping force versus piston rod displacement characteristics of the compression stop assembly shown in FIG. 1.

FIG. 10 shows a damping force characteristics of the compression stop assembly 8 of the damper 1 shown in FIG. 1 and described above, as measured during compression stroke starting from the point where the piston assembly 4 engages the engaging bumper 89 (both piston rod displacement and damping force equal zero). As shown within the first range $R_1$ the engaging spring 88 compresses, thus linearly increasing the damping force. At a certain point the load of the engaging spring 88 equalizes the initial preload of the disengaging spring 87 and the latter compresses operating in series with the engaging spring 88 and axially displacing the covering member 85 along with the bolt 82 and further increasing the damping force within the second range $R_2$. With yet further displacement of the piston assembly 4, within the third range $R_3$, the rotating member 84 rotates in cams 812 and its covering projections 843 gradually cover the compression flow channels 853 of the covering member 85 so that eventually only the diminishing annular channel 852 remains available for a flow of the working liquid until it is entirely closed.

Other embodiments of the compression stop assembly may obviously enable for a flow of working liquid even though the covering member 85 abuts the body 81 (cf. FIG. 3, FIG. 4) by means of additional channels, annular gaps in the covering member 85 or the body 81, etc.

As shall also be obvious for a skilled technician, the number, thickness and/or material of the deflective discs 86, the number and the cross-flow area of the channels 853 and 854, axial stiffness of the engaging spring 88, axial stiffness of the disengaging spring 87, the shape of the cams 812, the shape of the radial projections 843 covering the compression flow channels 853, etc. all provide excellent capabilities for setting various thresholds and flow restrictions to be generated for working liquid passing through the compression stop assembly 8 while being engaged by the piston assembly 4. This in turn provides virtually unlimited capabilities for shaping and tuning a preferable damping force characteristics of the compression stop assembly 8.

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in appended claims.

We claim:

1. A hydraulic damper for a motor vehicle hydraulic suspension damper, comprising a main tube filled with a working liquid, a piston assembly disposed slidably inside said main tube and dividing said main tube into a rebound chamber and a compression chamber, said hydraulic damper provided with a rebound valve assembly and a compression valve assembly to control a flow of said working liquid within said main tube during rebound and compression strokes of said hydraulic damper, said piston assembly attached to a piston rod that is led outside said hydraulic damper, and a compression stop assembly located in said compression chamber;

said compression stop assembly comprising a body, an axial member disposed slidably within said body, and a covering member fixed on said axial member, said covering member further comprising at least one compression flow channel and at least one rebound flow channel;

a disengaging spring preloaded between said body and said covering member;

said compression stop assembly further comprising: a rotating member disposed pivotally with respect to said body and capable of at least partially covering said at least one compression flow channel depending on an angular position of said rotating member with respect to said at least one compression flow channel; and at least one cam configured to cooperate with said rotating member to change its angular position with respect to its axial displacement;

wherein axial displacement of said covering member towards said body, while being engaged by said piston assembly results in covering said at least one compression flow channel by said rotating member; and wherein said rotating member comprises at least one radially extending cylindrical projection cooperating with said at least one cam which has a spiral shape in an inner annular surface of said body and wherein said at least one radially extending cylindrical projection is disposed in said at least one cam.

2. The hydraulic damper according to claim 1, wherein said compression stop assembly is further provided with an engaging spring attached to said covering member and terminated with an engaging bumper.

3. The hydraulic damper according to claim 1 wherein said compression stop assembly further comprises at least one deflective disc covering a compression side of said at least one rebound flow channel and providing unrestricted inflow of said working liquid to said at least one compression flow channel from said compression chamber.

4. The hydraulic damper according to claim 1 wherein said rotating member further comprises at least one radial projection adapted to cover said at least one compression flow channel.

5. The hydraulic damper according to claim 1 wherein said at least one compression flow channel is a plurality of equiangularly spaced, slanted, compression flow channels and said at least one rebound flow channel is a plurality of equiangularly spaced, axial, rebound flow channels.

6. The hydraulic damper according to claim 1 wherein said hydraulic damper is a twin-tube damper.

7. The hydraulic damper according to claim 6 wherein said body of said compression stop assembly has the form of a sleeve fixed between a compression end of said damper main tube and a damper base valve assembly and is provided with at least one channel enabling a flow of said working liquid between said compression chamber and a compensation chamber through said base valve assembly.

* * * * *